US010950124B2

(12) United States Patent
Nijhuis

(10) Patent No.: US 10,950,124 B2
(45) Date of Patent: Mar. 16, 2021

(54) LICENSE PLATE RECOGNITION

(71) Applicant: Jos A. G. Nijhuis, Hooghalen (NL)

(72) Inventor: Jos A. G. Nijhuis, Hooghalen (NL)

(73) Assignee: Q-Free Netherlands B.V., Bellen (NL)

( * ) Notice: Subject to any disclaimer, the term of this patent is extended or adjusted under 35 U.S.C. 154(b) by 23 days.

(21) Appl. No.: 15/683,283

(22) Filed: Aug. 22, 2017

(65) Prior Publication Data

US 2019/0066492 A1    Feb. 28, 2019

(51) Int. Cl.
| | |
|---|---|
| *G08G 1/017* | (2006.01) |
| *G06K 9/03* | (2006.01) |
| *G06K 9/00* | (2006.01) |
| *G06K 9/32* | (2006.01) |
| *G08G 1/054* | (2006.01) |

(52) U.S. Cl.
CPC ....... *G08G 1/0175* (2013.01); *G06K 9/00771* (2013.01); *G06K 9/036* (2013.01); *G06K 9/325* (2013.01); *G08G 1/054* (2013.01); *G06K 2209/15* (2013.01)

(58) Field of Classification Search
None
See application file for complete search history.

(56) References Cited

U.S. PATENT DOCUMENTS

| | | |
|---|---|---|
| 6,473,517 B1 | 10/2002 | Tyan et al. |
| 8,059,868 B2 | 11/2011 | Matsumoto et al. |
| 8,447,112 B2 | 5/2013 | Paul et al. |
| 8,483,440 B2 | 7/2013 | Fan et al. |
| 8,509,486 B2 | 8/2013 | Hsieh et al. |
| 8,781,172 B2 | 7/2014 | Kozitsky et al. |
| 8,798,325 B2 | 8/2014 | Wu et al. |
| 9,092,979 B2 | 7/2015 | Burry et al. |
| 9,158,995 B2 | 10/2015 | Rodriguez-Serrano et al. |
| 9,384,423 B2 | 7/2016 | Rodriguez-Serrano et al. |
| 9,536,315 B2 | 1/2017 | Bulan et al. |
| 9,563,814 B1 | 2/2017 | Wilbert et al. |

(Continued)

FOREIGN PATENT DOCUMENTS

EP    2336980    6/2011

OTHER PUBLICATIONS

Gonçalves, Gabriel Resende, David Menotti, and William Robson Schwartz. "License plate recognition based on temporal redundancy." 2016 IEEE 19th International Conference on Intelligent Transportation Systems (ITSC). IEEE, 2016. (Year: 2016).*

(Continued)

*Primary Examiner* — Vu Le
*Assistant Examiner* — Tracy Mangialaschi
(74) *Attorney, Agent, or Firm* — Mark Wisnosky

(57) ABSTRACT

A license plate recognition and secondary image review system and processes are described. The system supplements optical character recognition with a secondary image review process that matches an acquired image with either images in a trusted database of historic confirmed identification or with fingerprint data derived from the images compared with confirmed fingerprint data from prior identifications contained in a trusted data base. The system provides an alternative to manual reviews in a selected subset of OCR identifications, while maintaining a preselected accuracy and risk of misidentification.

4 Claims, 11 Drawing Sheets

(56) References Cited

U.S. PATENT DOCUMENTS

| | | | |
|---|---|---|---|
| 2009/0208060 A1 | 8/2009 | Wang et al. | |
| 2012/0275653 A1 | 11/2012 | Hsieh et al. | |
| 2013/0259314 A1* | 10/2013 | Kozitsky | G06K 9/3258 |
| | | | 382/105 |
| 2014/0270386 A1* | 9/2014 | Leihs | G06K 9/325 |
| | | | 382/105 |
| 2014/0355837 A1* | 12/2014 | Hedley | G06Q 30/0283 |
| | | | 382/105 |
| 2017/0372161 A1* | 12/2017 | Almeida | G06K 9/00785 |

OTHER PUBLICATIONS

Oliveira-Neto, Francisco Moraes, Lee D. Han, and Myong K. Jeong. "Online license plate matching procedures using license-plate recognition machines and new weighted edit distance." Transportation research part C: emerging technologies 21.1 (2012): 306-320. (Year: 2012).*

Sadlier, David A., et al. "Image-based vehicle indexing for a seaport transportation surveillance system." 2011 8th IEEE International Conference on Advanced Video and Signal Based Surveillance (AVSS). IEEE, 2011. (Year: 2011).*

Gilly, Divya, Raimond, Kumudha, A Survey on License Plate Recognition Systems, International Journal of Computer applications, vol. 61, No. 6, p. 34 (2013).

Sharma, Vandini et al. Automatic License Plate Recognition USIG Optical Character Recognition and Template Matching on Yellow Color License Plate. International Journal of Innovative Reseach in Science, Engineering and Technology, vol. 3, Issue 5, (May 2014).

* cited by examiner

LICENSE PLATE RECOGNITION

CROSS-REFERENCE TO RELATED APPLICATIONS

Not applicable.

BACKGROUND OF THE INVENTION

Technical Field

The present invention relates to License Plate Image Review systems and methods for reading large numbers of images of license plates highly efficiently and at high accuracy.

Related Background Art

Roads and highways are becoming increasingly more automated. On toll roads, manual toll collection is being replaced by sensors and automatic license plate readers and manual image review systems. Toll systems are being set up to control, toll and in some cases restrict traffic not just on toll roads but congested inner city regions. Automated systems are required that recognize both subscribers to the systems and non-subscribers. Non-subscribers may include visitors from different regions and occasional users of the road systems being monitored. The systems are required to cost effectively recognize a wide variety of license plates and features on thousands of cars passing daily at speeds that require high-speed photography both night and day and in all drivable weather conditions and all ambient lighting situations. The conditions of the vehicles and the plates often make images amenable to automated character recognition difficult. Enforcement of tolls requires systems that are highly reliable and systems whose results can be verified. Accuracy requirements are license plate number recognition with error rates at low parts per thousand. High failure rates result in lost revenue, significant verification costs, customer complaints and disputes related to billing. Current systems make limited use of all of the available system information available to support highly efficient license plate recognition systems and require significant amounts of manual reviews. Any additions or modification to the systems that limit manual reviews can result in significant improved efficiency. A system is needed that combines with past recognition data, past road usage data, billing data and image matching. The system should be capable of self-improvement as a database of verified reads of license plates is developed. There is a need for a system that takes advantage of the abundance of data in the form of individual successful and unsuccessful license plate reads that are often available. The system should be able to provide a confidence estimate for the read of a license plate and automatically improve this estimate with experience. The system should be able to be self-improving with respect to its own accuracy of license plate reads. Most optical character recognition ("OCR") techniques on the market today only process the gray-scale information in images, removing any color information from color images prior to processing. The system should make use of this color information to improve automated image processing efficiency and accuracy.

There is a need for an improved license plate reading system that is capable of error rates in the low part per thousand or better. There is a need for a system that judiciously uses manual verification. There is a need for a system that is self-improving over time using past data to improve future reads. There is a need for a system that makes improved use of image data to improve the efficiency and accuracy of the license plate recognition system.

DISCLOSURE OF THE INVENTION

A system is described that addresses the deficiencies of the prior art systems described above. A license plate reading system and method of use is described that makes use of past verified data to select subsets of license plates that appear repeatedly on a roadway and then uses a second step of secondary image analysis to improve the OCR read accuracy of the license plates of this selected subset. The system combines analysis of past verified data from previous appearances of a particular vehicle on the roadway. Past verified data includes images of the vehicle, the character recognition of the license plate, and billing data. The past verified data is used to select those repeatedly appearing license plates that could benefit from a secondary image comparison step.

The process for reading license plates at high accuracy includes an initial read of the characters of the plate as well as verification that the reading is accurate. One embodiment includes comparing the license plate read results with previously identified vehicles on the same roadway. It is common for vehicles to repeatedly transit the same roadway or section of the same roadway. Repeated identification of the vehicle increases the confidence in the read and allows verification to be automated based upon a repeated read of the same plate.

In one embodiment prior identifications of plates A and B are used to create a confirmed database of image(s) of the vehicle with plates A and image(s) of the vehicle with plate B. In one embodiment confirmation of an image in the confirmed database is based upon billing information. That is, a plate is identified as "A", the owner of the plate A is billed and payment is received from the owner of the plate A. In another embodiment confirmation of an image in the confirmed database is based upon manual review of the image.

In one embodiment a subgroup of repeatedly appearing license plates are selected on the basis of prior erroneous billing. Erroneous billing may be that a license plate "A" is misidentified as license plate "B". The owner of vehicle B is then billed instead of A. B denies or does not pay the bill and a billing error flags that the identification of A should be reviewed. In some prior art system this would flag results in all future occurrences of the identification of A are manually reviewed. Plates A and B are identified as a potentially confused subset of all images in the confirmed database.

In another embodiment the subset of potentially confused plates is selected a priori on the basis of having known confused characters in similar locations in the sequence of characters on the plates. That is plate A may have a 3 as the first character and plate B may have an 8 as the first character and 3 and 8 are known to be regularly confused by optical character recognition systems.

In one embodiment a subsequently acquired image of a vehicle, where optical character recognition identifies plate A, is compared pairwise with the confirmed database images of A and B and if the pairwise comparison results in selection of the confirmed image of A, the character recognition of plate A is confirmed, and, if the pairwise comparison of images results in selection of the confirmed image B the character recognition of A is rejected. In one embodiment, only the subset of confirmed images of A and B are compared with the subsequently acquired image. In another embodiment the potentially confused subset includes a plurality of images of previously identified and confirmed plates: A, B, C etc. In another embodiment, based upon historical data, a group of images is first identified as being from a potentially confused group wherein identification of a first licenses plate by OCR triggers a subsequent review of the newly acquired image by comparison with a library of previously identified and confirmed images of all members of the group. The identity of the license plate is then selected as the image that most nearly matches the newly acquired image when compared with the previously identified and confirmed images. The subsequent identification based upon image comparison may in fact overrule the identification of the license plate by OCR.

In another embodiment the selection of the group of images to be compared after an OCR identification is made a priori and does not depend upon historical data or historical confusion amongst a set of license plates.

MODES FOR CARRYING OUT THE INVENTION

The invented system includes hardware and processes to allow accurate reading of license plates on a vehicle typically moving at high speeds on a road.

Figure 1:
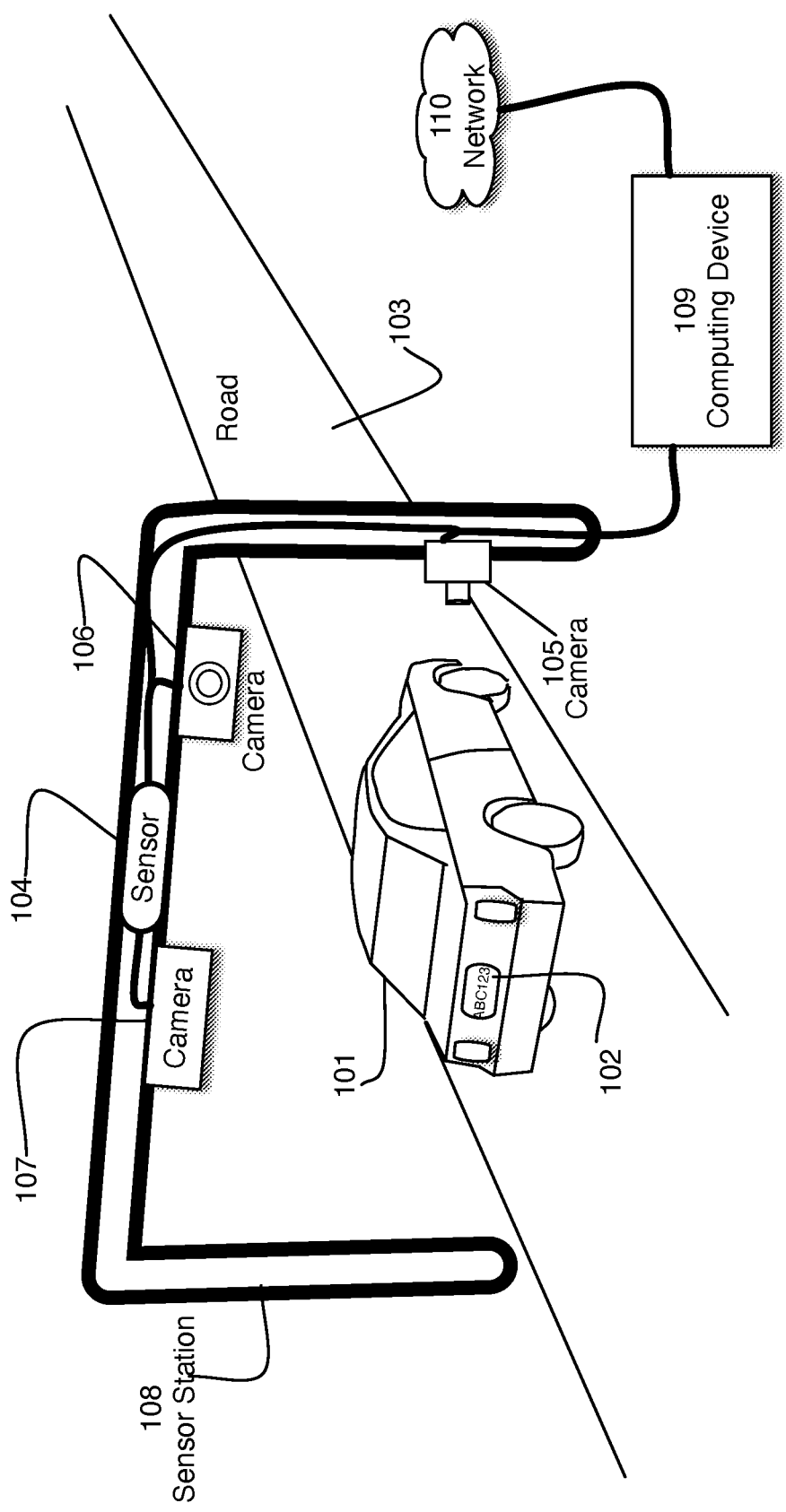
FIG. 1 is a block diagram of typical data acquisition hardware features for practicing the invention.

Referring now to FIG. 1 a license plate data acquisition system is shown. A vehicle, having a license plate 102 is traveling along a road 103. As the vehicle passes a sensor station 108 it is photographed by one or more cameras 105, 106, 107. The cameras may be positioned to acquire images of the front of the vehicle, the rear of the vehicle and the sides of the vehicle or all of the above. In one embodiment the acquisition of the image is triggered by a sensor 104 that detects the presence of the vehicle such as a radar sensor. In another embodiment presence of the vehicle is detected by motion in the acquired video images form the cameras. In another embodiment the vehicle is detected by breaking a light sensor. In another embodiment the vehicle is detected using a magnetic sensor in the roadway. The detector may be an optical sensor or radar sensor or may be motion detection within a camera system. The cameras may acquire images just as a vehicle passes or may acquire images continuously and select those images where there is motion and a vehicle is detected. The sensors and cameras are connected to a computing device 109 that is further connected to a network 110 for sending acquired images to data processors for license plate recognition. In one embodiment the license plate recognition is accomplished locally. In another embodiment the data is sent to a remote location and license plate recognition is done remote from the sensor system. In other embodiments the sensors may further include sensors that read radio frequency identification tags on a vehicle and make measurements of the vehicle including vehicle size, shape and weight. In these cases, the sensors may include radar sensors, reflected structured light sensors and weight sensors such as strain gauges built into the pavement over which the vehicle is passing.

In another embodiment (not shown), there are multiple sensor stations. The sensor stations may acquire images independently or in a coordinated fashion and are interconnected through a local network or through the Internet to a processor that may further include program storage including license plate recognition processing and local storage of data and database information related to license plate recognition. The system may be further networked to remote processors for license plate recognition and billing. The connection may be through any wired or wireless network as known in the art and the Internet.

Figure 2:
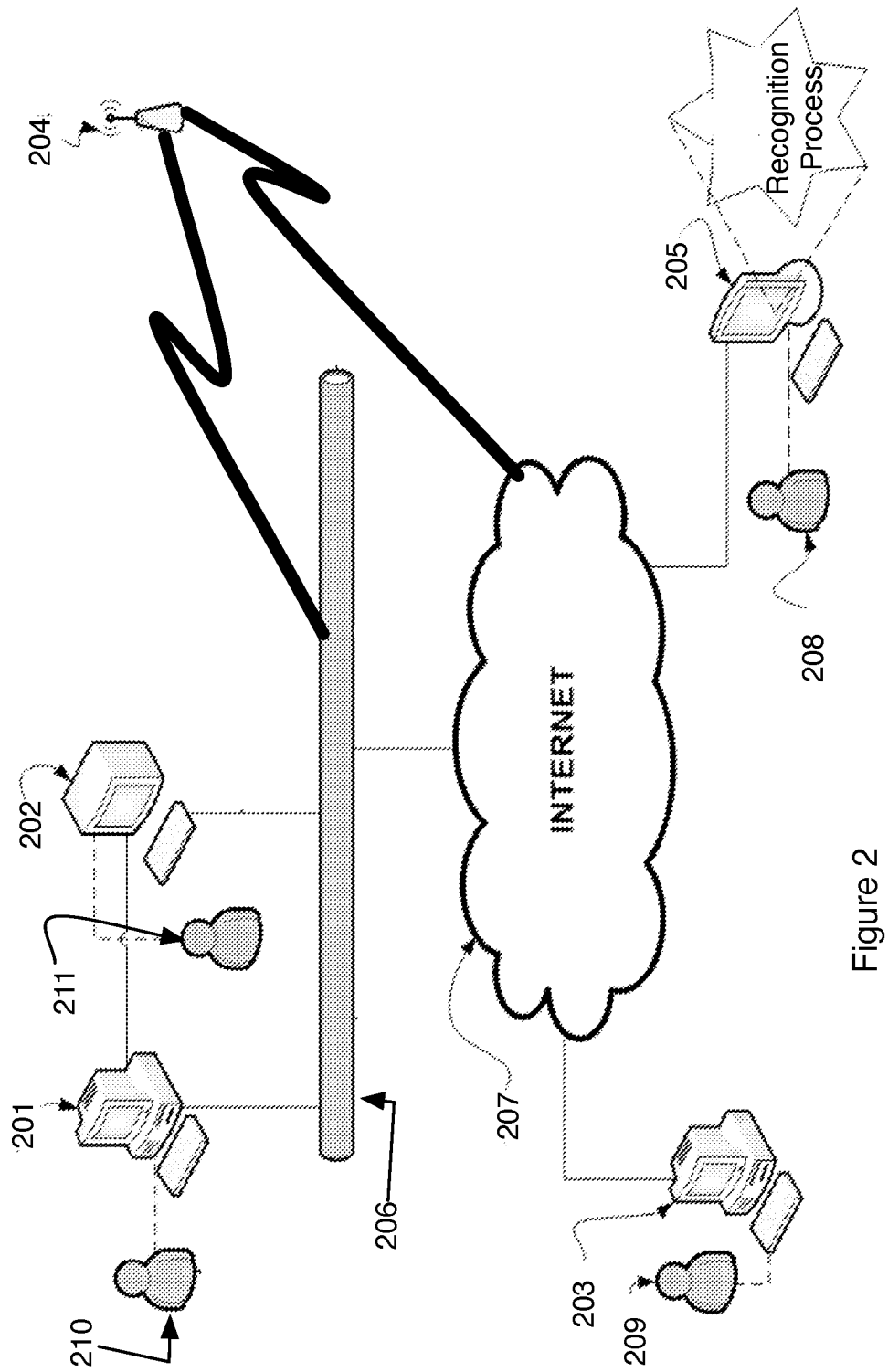
FIG. 2 is a block diagram of typical computer processing hardware for practicing the invention.

Referring to FIG. 2 an exemplary hardware computing system used to practice the invention is shown. A data acquisition system 204 sends data acquired from a passing car to a computing system 205. The data acquisition system, such as that described in FIG. 1, includes a camera for taking an image of the license plate on the vehicle. In another embodiment the data acquisition system further includes cameras for taking photographs of both the license plate and the vehicle. In another embodiment the data acquisition system includes both visual and other vehicle identification measures such as radio frequency identification of tags on a passing vehicle. The system further includes computing systems 201, 202, 203, 205. The computing system includes components known in the art for computing systems, including a user interface, electronic memory storage, electronic processors and input/output ports to communicate electronically with other devices. The connection between the data acquisition system 204 and the computing systems 201, 202, 203, 205 may be wired or wireless and may be through a local network 106 or through the Internet 107 or both. At least one 205 of the computing systems are programmed with license plate optical character recognition software that analyzes the data from the data acquisition system 204 and identifies the characters on the license plate, and thereby identifies the vehicle and vehicle owner. Another of the computing devices 203 may be used for manual review of the images from the data acquisition system to verify the accuracy of the character recognition. Another computing device 202 may include database and/or links to databases. Nonlimiting examples of the databases include a database of vehicle images whose identity has been confirmed, a database of vehicle features other than the characters of the license plate, a database of vehicle registration data that identifies owners of vehicles linked to the character strings on the license plates of the vehicles, a database of billing data showing prior identification history of a vehicle on the roadway where the data acquisition system 204 is located as well as payment and complaint history, if any, arising from erroneous billing. Other of the computing devices 201 may include billing software that bills the owners of vehicles identified on the roadway for tolls related to roadway use, or for infractions such as speeding on the roadway. The system further includes operators 208, 209, 210 and 211. The operators may operate at the computer that includes the recognition process or may operate at computers linked to the recognition process computer via a local network, or through the Internet. The multiple computers in the system 201, 202, 203, 205 may be programmed to display data from the remote sensor 204 for review by operators 208, 209, 210, 211. In one embodiment all operations are on a single computer with a single operator for review (for example just 205, 208). In another embodiment as shown a plurality of computers and operators are included. The plurality of computers and operators may be centrally located at a single site or dispersed across multiple sites linked by the internet 207 or other network system 206 including both intra and internet and including both wired and wireless means of communication. The recognition process includes automated analysis and recognition of the license plate and identification of the vehicle and owner as well as a decision system to include manual review by one or more operators 208-211. In one embodiment at least one of the operators/computers is used for billing of the owner of the vehicle identified as passing the sensor 204. Bills may be sent to the identified owners of the vehicle either electronically or through printing and regular mail. The billing system further includes information related to paying of the bills by customers. This information may be obtained through electronic links to banking systems (not shown). The computing systems include storage for transaction data that includes identification of passing vehicles, identification of owners of passing vehicles through motor vehicle registration systems, billing and payment records for the transactions where the vehicle is identified as passing a tolling point on a road, image data of the vehicle and the license plate on the vehicle.

Figure 3:
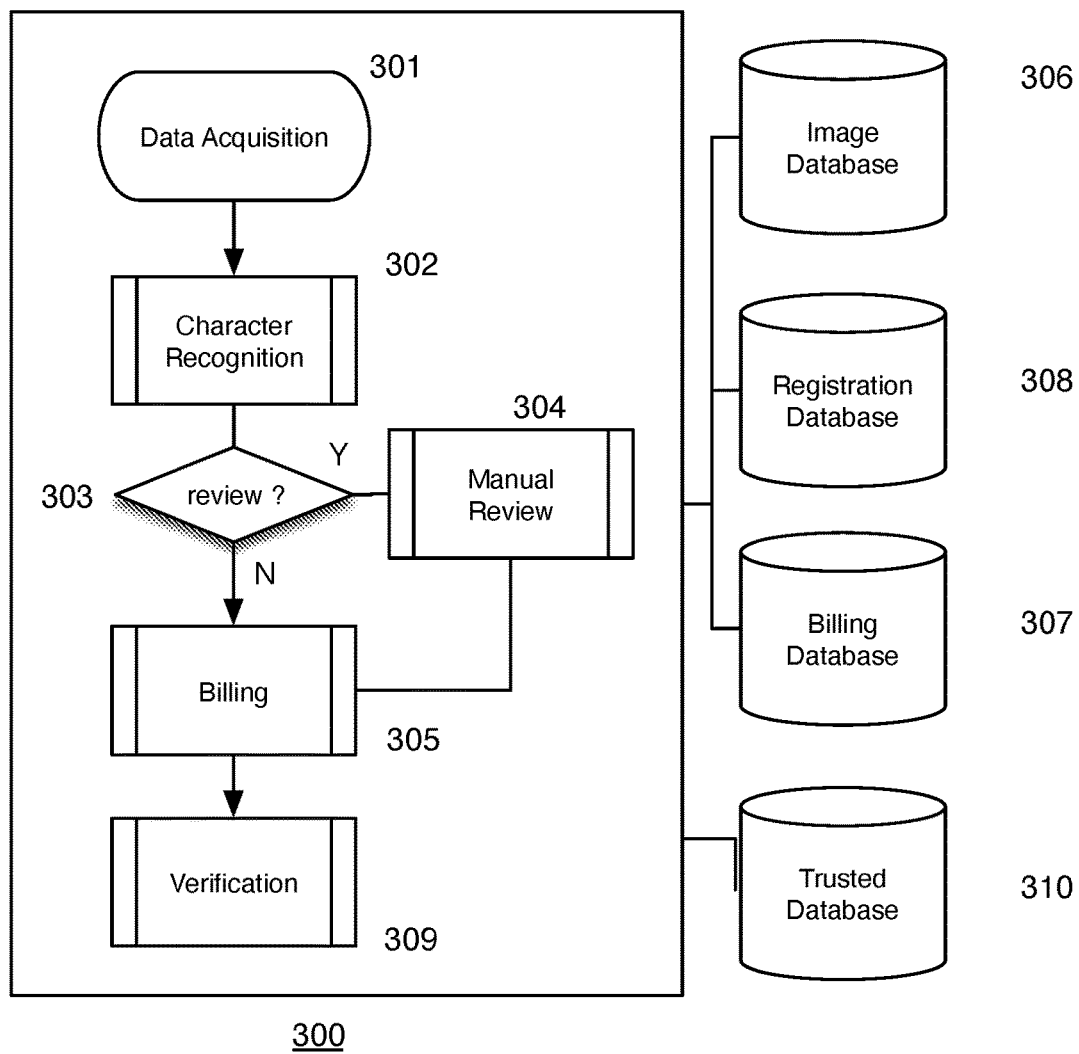
FIG. 3 is a block and flow diagram of main elements of an embodiment of the system.

FIG. 3 shows a combination of a block diagram and flow diagram for a first learning phase of the invention. The flow chart 300 may access any and all of the databases 306, 307, 308, 310 as required for the operation step included in the flow chart 300. Data is acquired 301. The data includes an image of the license plate and vehicle as described using the equipment of FIGS. 1 and 2. The image is stored, at least temporarily, in an image database 306. The license plate portion of the image is isolated and characters of the license plate are recognized using optical character recognition software 302. The optical character recognition software produces an identification and an estimate of the confidence in that recognition. The characters of the license plate are associated with a license plate registration database 308, with past billing database 307 and with the acquired image database 306. If prior history shows no issues with this particular identification or if the confidence estimate in the identification is high, the associated owner of the plate is billed 303. The billing is, for example, for use of the roadway or a violation on the roadway. If there is doubt as to the identification a decision 303 is made to review the identification 304 prior to billing 305. The decision may be made on low confidence estimate in the OCR or past billing data 307 that shows errors have been made in the past with the particular set of characters recognized on this license plate. Typically, in prior art systems without the invented secondary image review, once a billing error is identified, all future OCR recognitions of the particular license plate are then subject to manual review 304. Once the identification is verified through manual review, the owner of the vehicle with the particular identified plate is billed and if payment for the billing is received, the identification is verified 309. In some case the verification requires multiple identification, billing and receipt cycles before the identification is verified 309. Once verified the image from the pictorial database 306 may be combined with the other billing 307 and registration 308 information to produce an entry in a trusted database 310. In another embodiment the trusted database includes non-character data that can uniquely identify the vehicle. Non-character data includes the make of the vehicle, the color of the vehicle, the size of the vehicle, ornamentation on the vehicle, including bumpers and hood ornaments, damage to the vehicle and bumper stickers affixed to the vehicle. Such enumerated non-character information is derived from the image of the vehicle and is termed fingerprint data. The secondary image review as described below can make use of image data, fingerprint data or both. Subsequent discussion of analysis of image data implies analysis of image data, fingerprint data or both. The flag requiring manual review may be included in the billing database or in the trusted database or both. A trusted and verified identification does not necessarily preclude a requirement for future manual reviews 304 of the license plate OCR identification. The combined billing and payment history 307, the image 306, the registration information 308 once verified 309 are all combined into a trusted database 310. Although described as separate databases, the databases 306, 307, 308, 310 may in fact be a single, two or a plurality of databases with flags set for whether the data is verified, whether manual review is required and so forth. In one embodiment there are a plurality of images 306 in the database but only a subset of these images are associated with a verified identification and are therefore included in the trusted database or flagged as being associated with trusted data.

Figure 4:
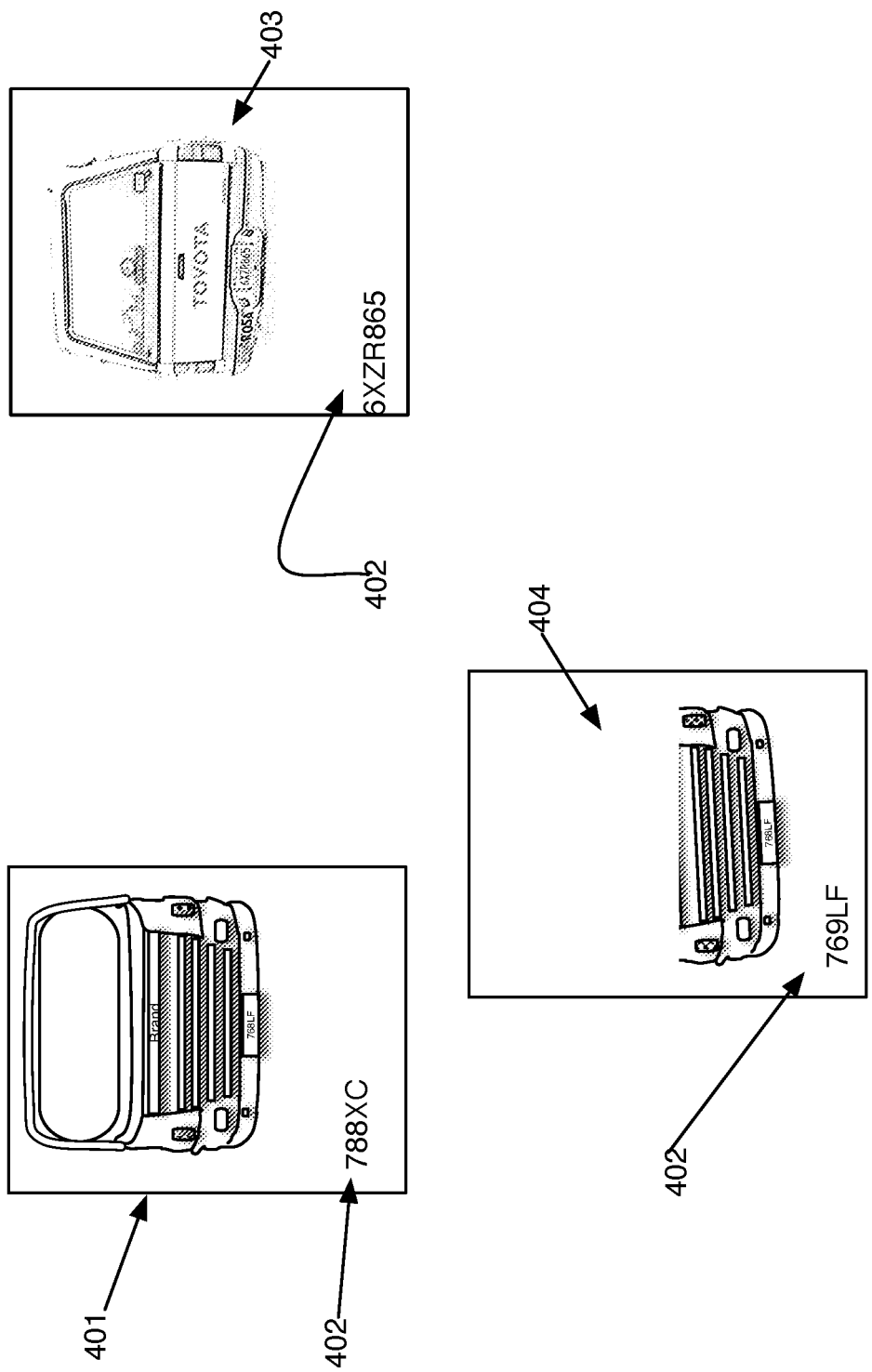
FIG. 4 shows features of a confirmed/trusted database as practiced in the invention.

FIG. 4 shows elements of a trusted database. In one embodiment the database includes images 401, 403, 404 of vehicles and associated data 402. Here the data is represented by confirmed license plate numbers. But confirmed data can also include billing history, vehicle owner information, etc. The images of the vehicles may show complete fronts of vehicles 401, rear of vehicles 403 and partial views of vehicles 404. The trusted database may include a single view of a vehicle or multiple views of the vehicle. Although all of the images shown, show a license plate in the image, embodiments of the images include views of the vehicle where the license plate is not visible. In another embodiment the trusted database includes information that is extracted from the image of the vehicle. In another feature information is extracted from the image and indexed to create a fingerprint and the fingerprints of features are stored in the trusted database. Non-limiting examples of fingerprint information includes the make of the vehicle, the color of the vehicle, the size of the vehicle, ornamentation on the vehicle, including bumpers and hood ornaments, damage to the vehicle and bumper stickers affixed to the vehicle.

Figure 5:
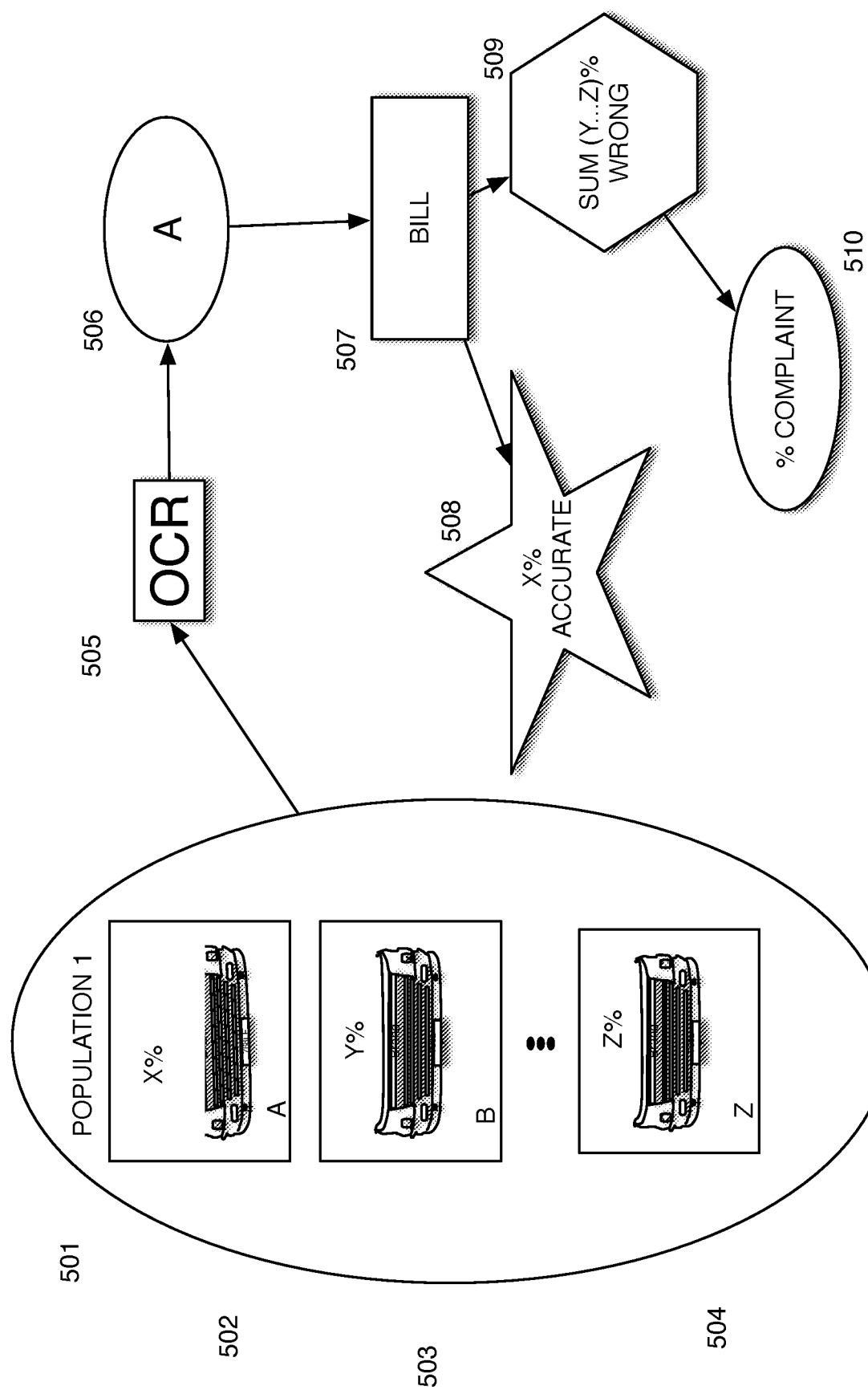
FIG. 5 is a diagram showing a review process for the learning phase of the invention.

FIG. 5 depicts a review process of past data that is used to select a subset of potential plates for secondary review. The past data 501 includes a population of images 502-504 that are selected on the basis of all having been identified by OCR as vehicle A. Note that not all of the vehicles in the population are in fact vehicle A. The historic data shows that OCR resulted in billing 507 of the owner of vehicle A. X % of this billing is accurate 508 and the remainder 509 is inaccurate with a portion of the billing resulting in customer complaints 510. The prior art response to this historical data is that all of the subsequent OCR identifications of vehicle A are flagged and manually reviewed. The same may be true for the OCR identification of the rest of the vehicles in the population 501. The learning process of the current invention flags OCR identification for secondary review and further flags that the rest of the vehicles in the set 501 are to be included for comparison in the review of data where the OCR result is vehicle A. Note that there may be just two vehicles A and B in the population 501 or there may be a plurality of vehicles in the population 501 (A-Z). The first step is to identify that there are issues with the identification of a first vehicle and then to further identify other vehicle identifications that are errantly identified in the population that OCR identifies as the first vehicle.

Figure 6:
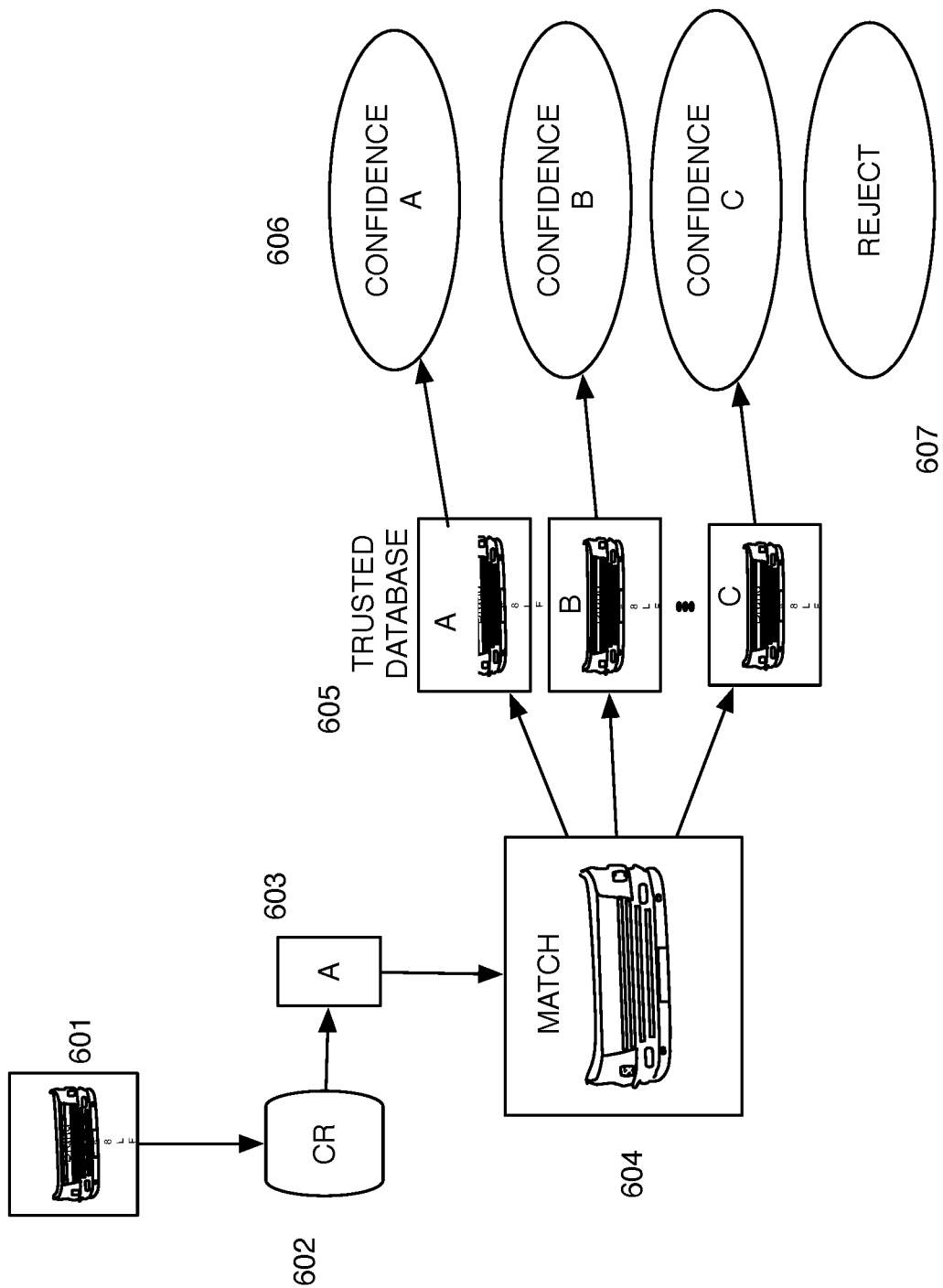
FIG. 6 is a diagram showing further elements of a learning process.

FIG. 6 shows part of the learning process for determining whether the the discrepancies encountered with identification of the vehicle shown in FIG. 5 can be resolved by a secondary review of the acquired vehicle information. As before, a plurality of image of a vehicle is acquired 601 over time and the license plate field is found in the image. Optical character recognition 602 is used and identifies the vehicle as vehicle A 603. This produces a population of vehicles that have been identified by OCR as vehicle A but are now known to include vehicles B, C, etc. Each of the identification instances including the individual images in the population are then compared 604 with the data in the trusted database 605. In one embodiment the comparison is an image match to each of the confirmed images in the trusted database. In one embodiment the image match includes translation and rotation of the image in each of the identification instances to minimize the pixel by pixel difference between the test image and the image in the trusted database. The pixel by pixel difference, in one embodiment, is the sum of the absolute values of the difference in the grayscale intensity value between the image in the trusted database and the test image for each pixel location. In another embodiment the difference includes color information and the difference includes the difference in red, green and blue intensities between the two images. In another embodiment the test image may be further geometrically scaled in addition to rotation and translation. In another embodiment the images are first matched only at particular features, such as the location and orientation of the license plate characters and the remaining pixels are all translated and rotated to the same degree as the translation and rotation required to match the character strings of the license plate area. In another embodiment fingerprint data are used to match the images, such as the location of ornamentation, the location and orientation of headlights, bumpers, turn signals, etc. The difference between the two images is used to provide a confidence measure 606 or estimate that the two images are the same. The confidence measure 606 may be scaled from 0 to 100, where 100 implies a perfect match of the images and 0 implies there is no confidence that the two images are of the same vehicle. In another, preferred embodiment, the confidence measure is scaled by a cost function. In one embodiment, the cost function is selected on the basis of the cost of making an error where two images are found to be the same but are in fact not. In the case of license plate recognition this would reflect the cost of confirming an identity of a vehicle and erroneously billing the wrong customer. A non-limiting example of a cost function includes a step function where the image confidence is set to zero if the image confidence is less than a pre-selected value. Another non-limiting example includes one where the image confidence is exponentially scaled to zero if the image confidence is less than a pre-selected threshold. Another non-limiting example includes a squared or cubic or other power function where the confidence calculated image confidence is scaled as a power function such that a pixel by pixel confidence of ½ would be scaled to ¼ or ⅛, etc. Again the particular form of the cost function is chosen so as to reflect the cost of erroneously confirming a license plate identification. If the cost of an error low is compared with the overhead cost of manual review, the cost function may scale in the other direction and the confidence is scaled in the opposite direction to take higher risk in errors in identification rather than incur the cost of additional manual review of the images in the license plate recognition.

In another embodiment rather than matching the entire images, feature information is first extracted from the image and indexed to create a fingerprint and the fingerprints of features are compared 604. Non-limiting examples of fingerprint information includes the make of the vehicle, the color of the vehicle, the size of the vehicle, ornamentation on the vehicle, including bumpers and hood ornaments, damage to the vehicle and bumper stickers affixed to the vehicle. A nonlimiting example of fingerprint comparison includes providing a weighted score for each feature that matches and then summing the weighted scores. The weighting may be through use of pre-selected values based upon the reliability of the identified feature. For example, make of the vehicle is given a higher weighting than matching damage on the vehicle, since damage might be repaired. Similarly color of the vehicle is given a higher weighting than temporary ornamentation such as bumper stickers. The sum of the weighted score again provides a confidence level 606 that the fingerprint of the test image and the fingerprint in the trusted database are in fact that of the same vehicle. The confidence level from the fingerprint comparison is further scaled by a cost function analogously to that described above for pixel by pixel comparison. In the preferred embodiment the confidence levels are independent. That is the confidence level that an image represents A in the trusted database is made independently from the confidence level that an image represents B in the trusted database. In another embodiment Bayesian formulae, as are known in the art, are applied and the confidence that an image represents A in the database is reduced by the presents of potentially conflicting images, B, C, D, etc. in the population of images identified by OCR as A. to reiterate, statements regarding comparison of images herein implies both pixel by pixel comparison of images and comparison of fingerprint data derived from images.

The confidence levels 606 are then ranked and the highest confidence level is selected as the secondary match for the vehicle identification. In some cases, a confidence level cannot be calculated or all of the confidence levels have that same value in which case no match is made and a reject 607 is determined. In the case of a reject no automatic secondary refinement of the vehicle identification is possible. A reject occurs if in the case of using fingerprints, the fingerprint information cannot be extracted from the image, or that in the comparison, all of the confidence values are the same. In some case the confidence levels may all be zero.

Figure 7:
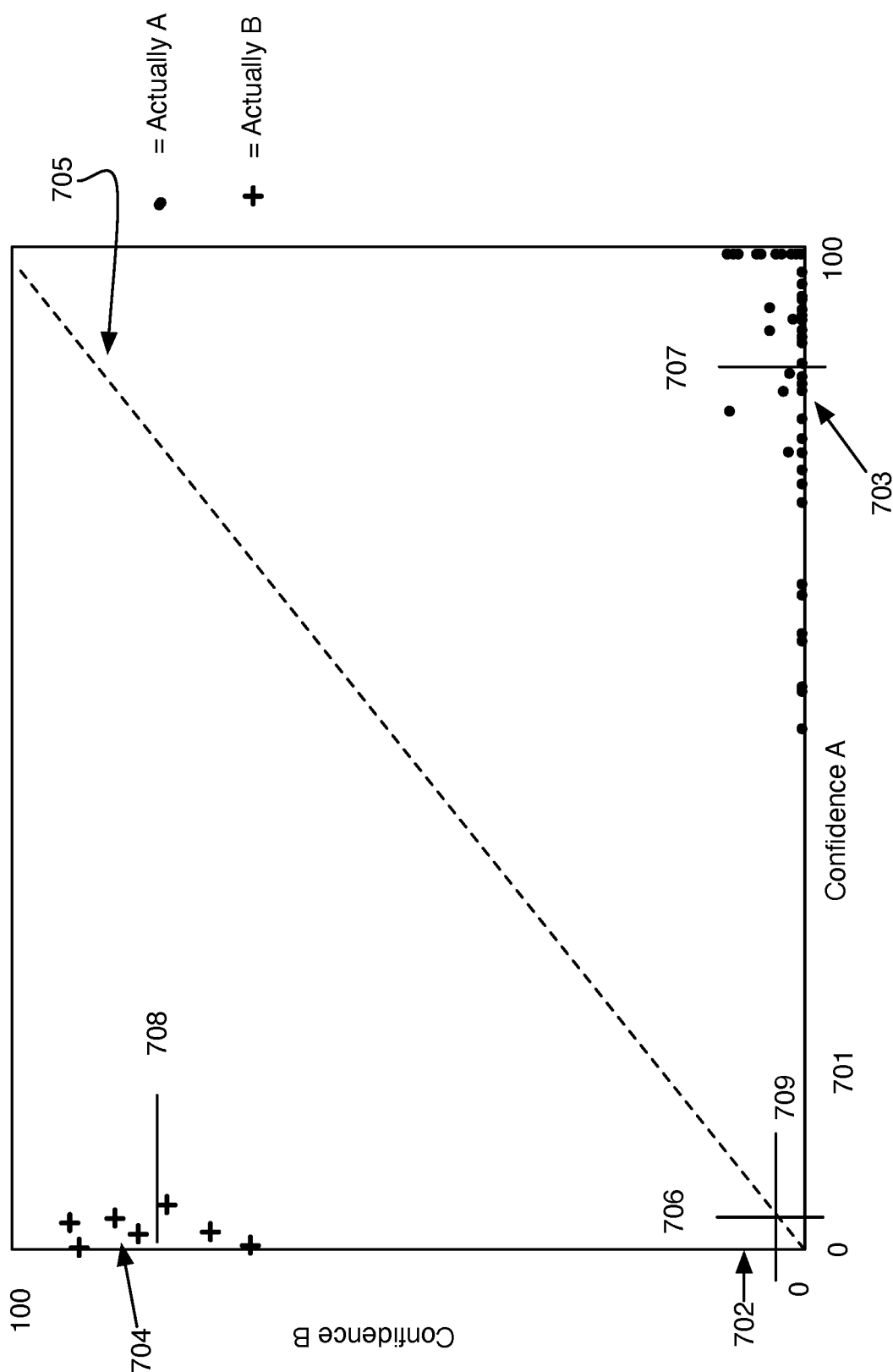
FIG. 7 shows a scatterplot of confidence measures in data obtained from the invention.

The confidence levels for the historic population as determined above are compared to determine suitability of the secondary image comparison 604-607 to confirm or deny the OCR identification without resorting to a manual review. FIG. 7 shows a scatterplot of confidence levels for two of the members of the population being tested for secondary comparison. The value of the confidence estimates that arise by comparison of a tests image with an image is that is confirmed as that of the A vehicle (that identified by OCR to create the population) is plotted along the x-axis 701. The X-axis represents confidence values obtained by comparing each image in the population with a confirmed A image in the trusted database. The confidence levels that the image is that for a second member of the population, the B vehicle, are plotted along the Y-axis 702. The Y-axis represents confidence values obtained by comparing each image in the population with a confirmed B image in the trusted database. In one embodiment the comparison of the test image is with a single confirmed image in the database of identified and confirmed images. In another embodiment the confirmed database includes a plurality of images that have been previously confirmed. The comparison, then, is with a plurality of images and the confidence of the identification based upon comparison of the images is an average of the confidence levels from multiple comparisons. In another embodiment the confidence is one selected from the mean, median, maximum and minimum of the confidences measured by comparison of the test image with a plurality of confirmed images. In another embodiment the confirmed database includes a plurality of images from a particular vehicle obtained at various times of day or night. In one embodiment the comparison of the test image is against a confirmed image that was obtained at the same time of day and therefore under similar lighting conditions.

The "." character indicates those images that have been otherwise confirmed as arising from the A vehicle. The "+" character indicates those images that have been otherwise confirmed as arising from images of the B vehicle. In the preferred embodiment B is the second closest match in the population of images to the image analysis identifying A. In another embodiment B is chosen as a composite of all images in the population that are known as not A, i.e. image analysis for vehicles B, C, D, etc. In the preferred embodiment the actual identification of an image as that of A or B is based upon the ranked confidence levels. Those in the lower left quadrant, below the line 705 are identified as A and those above the line 705 are identified in the secondary image analysis as B. The data in FIG. 7 are indicative of a dataset where secondary review through image matching is viable. All of the vehicles known to be actually A are clustered 703 at high confidence in the A identification and low confidence in the B identification. With the dataset shown, the image identification would not mis-identify any of the B images as A's and vice versa. 100% of the known A images fall below the line 705 and are therefore identified as A and 100% of known B images fall above the line 705 and are therefore identified as B. The confidence values for the known B images are all clustered in a region 704 indicating high confidence in the B identification and low confidence in A identification. The data show that the images consistently and clearly distinguish A from B. The same analysis is done pairwise or the other members of the population where the OCR identified the vehicle as A. Decisions as to whether the data set indicates secondary image analysis can be used to further distinguish vehicle A from B (and others) relies on the data shown in the chart. The average 707 of the confidence values comparing known vehicle A images with confirmed A images in the trusted database shows something in the neighborhood of a scaled confidence of 90. This is the value along the X-axis for the points known to be A ("."). The average 706 for the confidence the comparison of known images of B (i.e. not A) in the population with confirmed A images in the trusted database are low, around a scaled value of 5. This is the average value along the X-axis for the points known to be B ("+"). The average confidence 708 for comparing known images of B in the population with B images in the trusted database is also high around 80 on the scaled confidence range of 0 to 100. And finally the average confidence 709 for comparing known image of A in the population with a B image in the trusted database is low, around 5 or less. Note that in the data of FIG. 7 there are no images of A misidentified as B and vice versa. Such data points would show up as an A data point (".") located above the line 705 or a B data point ("+") located below the line 705.

Figure 8:
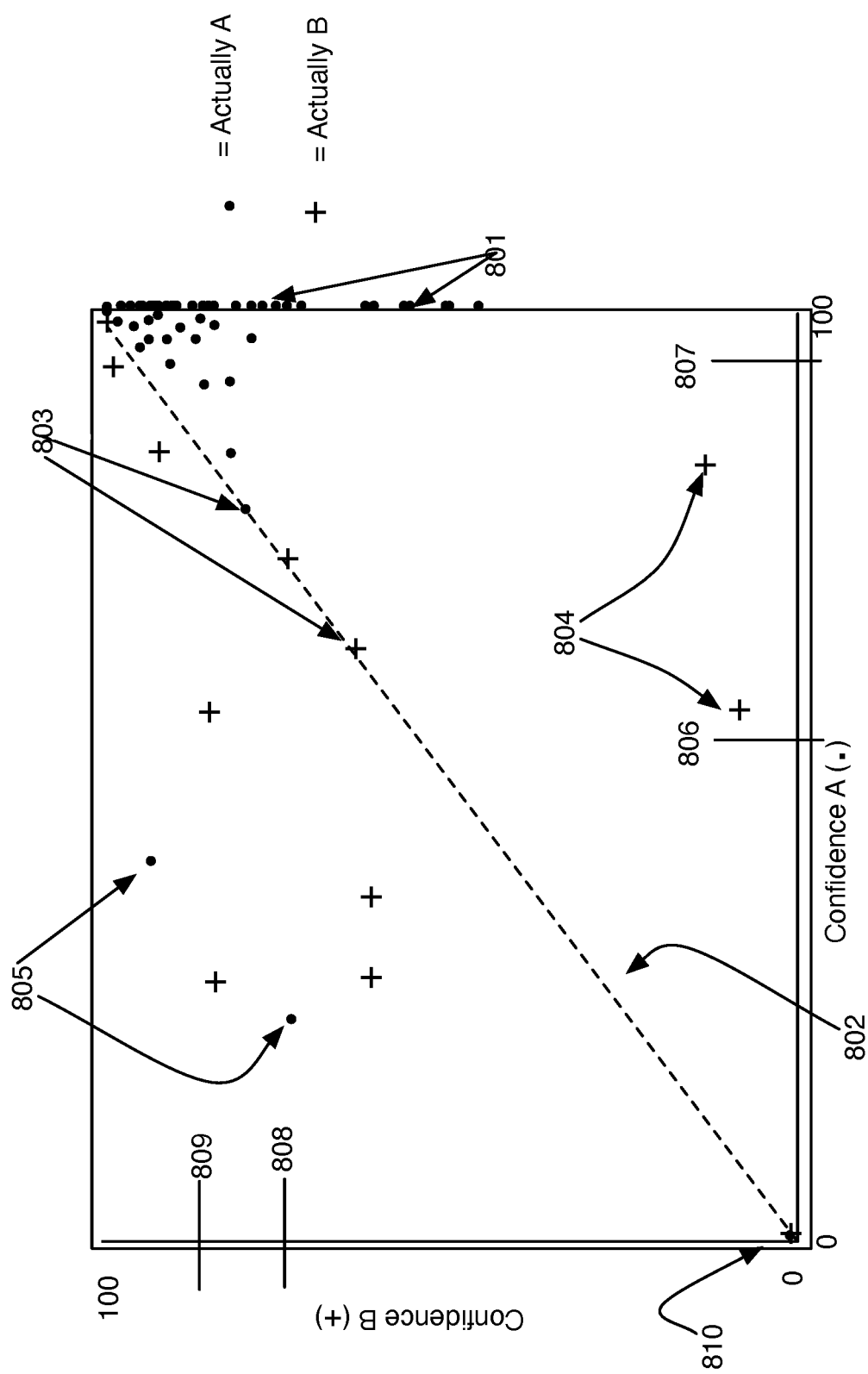
FIG. 8 shows a second scatterplot, contrasting to FIG. 7, of confidence measures in data obtained from the invention.

FIG. 8 shows a contrasting population. Again, the population is defined as one where OCR identified the vehicle as A, yet one of billing results, manual reviews, complaints and further analysis reveals that the population of vehicles identified by OCR as A actually consist of vehicles known to be A, B C etc. The image analysis, as described above, produces confidence estimates based upon the images alone as to whether each of the images in the test population match images in the trusted database of images (or fingerprint information). The plot is the same as that shown for FIG. 7. Confidence values derived from comparisons with an A image in the trusted database are plotted along the X-axis and confidence values derived by comparison with a B image in the trusted database are plotted along the Y-axis. There is in fact a cluster of data 801 that accurately, based upon ranking of the confidence estimates, identifies known A instances as A. Note however that in contrast to FIG. 7 the confidence level in the instances matching B are also high. The dashed line 802 represents equal values or the confidence in A and B and several points fall exactly on this line. These points 803 represent a reject in that neither A nor B is selected on the basis of ranked confidence estimates. Similarly, the population includes points 810 where the confidence in both A and B is zero. These points are also rejects. Additionally, there are several points that are mis-identified. Some points 804 known to be B are actually misidentified as A and some points 805 known to be A are misidentified as B. To be clear those points in the lower right of the graph have a higher A confidence than B and are identified by the secondary image analysis as A and similarly those in the upper right of the graph would be identified by the secondary image analysis and ranked confidence levels as B. The average value parameters 806, 807, 808, 809 of the graph of FIG. 8 are labelled correspondingly the same as those 706, 707, 708, 709 of FIG. 7. The average confidence value 807 derived by comparison of a known image of A in the population with a confirmed A image in the trusted database is high, again as in the previous dataset around a scaled value of 90. However, the average confidence 806 for comparison of a known image of B in the population of images with a confirmed A image in the trusted database is also relatively high at around 60. The average value 808 for comparison of a known image of B with a B image in the trusted database is around 70. But the average confidence value 809 for comparison of a known image of A with an B image in the trusted database is even higher at about 80. Also in this examples there are points 805 of A misidentified as B and points 804 of B misidentified as A.

The inventor has found that a set of rules will determine the suitability of a secondary image analysis to resolve OCR license plate identification. As a reminder, the population of images that is being tested arises from a set of license plate images that are identified by OCR as being license plate A. The identity of each image in the population is confirmed manually or otherwise and is compared with an image known to be A in the trusted database and also compared with images that are known to be B, C, D, etc. in the trusted database. The trusted database can be considered, in some ways, a set of standards. The rules may be summarized as:

Average Confidence Confirmed A in population compare with A in trusted database>a % (1)

Average Confidence Confirmed B in population compare with A in trusted database<b % (2)

Average Confidence Confirmed B in population compare with B in trusted database>c % (3)
Average Confidence Confirmed A in population compare with B in trusted database<d % (4)
Percent confirmed A in population identified as B<e % (5)
Percent confirmed B in population identified as A<f % (6)
Percent Rejects<g % (7)

Referring back to FIGS. 7 and 8, Rule 1 refers to the averages identified by values 707, 807. Rule 2 refers to the averages identified as by values 706, 806. Rule 3 refers to the average values identified by values 708, 808. Rule 4 refers to the average values identified by 709, 809. Rules 5 and 6 refer to misidentification based upon the ranked confidence values. Rule 5 refers to the points 805 in FIG. 8 and rule 6 refers to the points 804 in FIG. 8. In another embodiment there is a further Rule 7 that places an upper limit on the percentage of the points in the population that results in rejects. Again a reject point is one that cannot be identified as either A or B based upon ranked confidence estimates.

The values of the preselected parameters a-g are chosen to maintain a pre-selected accuracy in identifying a license plate as A when the plate is in fact A, while minimizing misidentification or errant confirmation of a license plate as A when the plate is in fact not A. In a preferred embodiment the values of the selected parameters are selected on the basis of lost revenue for not identifying an actual license plate A balanced against the cost of misidentifying a license plate A and the cost of manual review of the data to confirm an OCR identification. If the rules 1-7 are all satisfied the identified license plate is tagged such that future OCR identification of the plate will be automatically reviewed through the secondary image review process described above and also as described further in subsequent Figures. In another embodiment only a subset of the rules 1-7 are required to tag the OCR identification for secondary image review. As one example of such an embodiment, only the rules that measure the error percentages (rules 5 and 6) are used.

Figure 9:
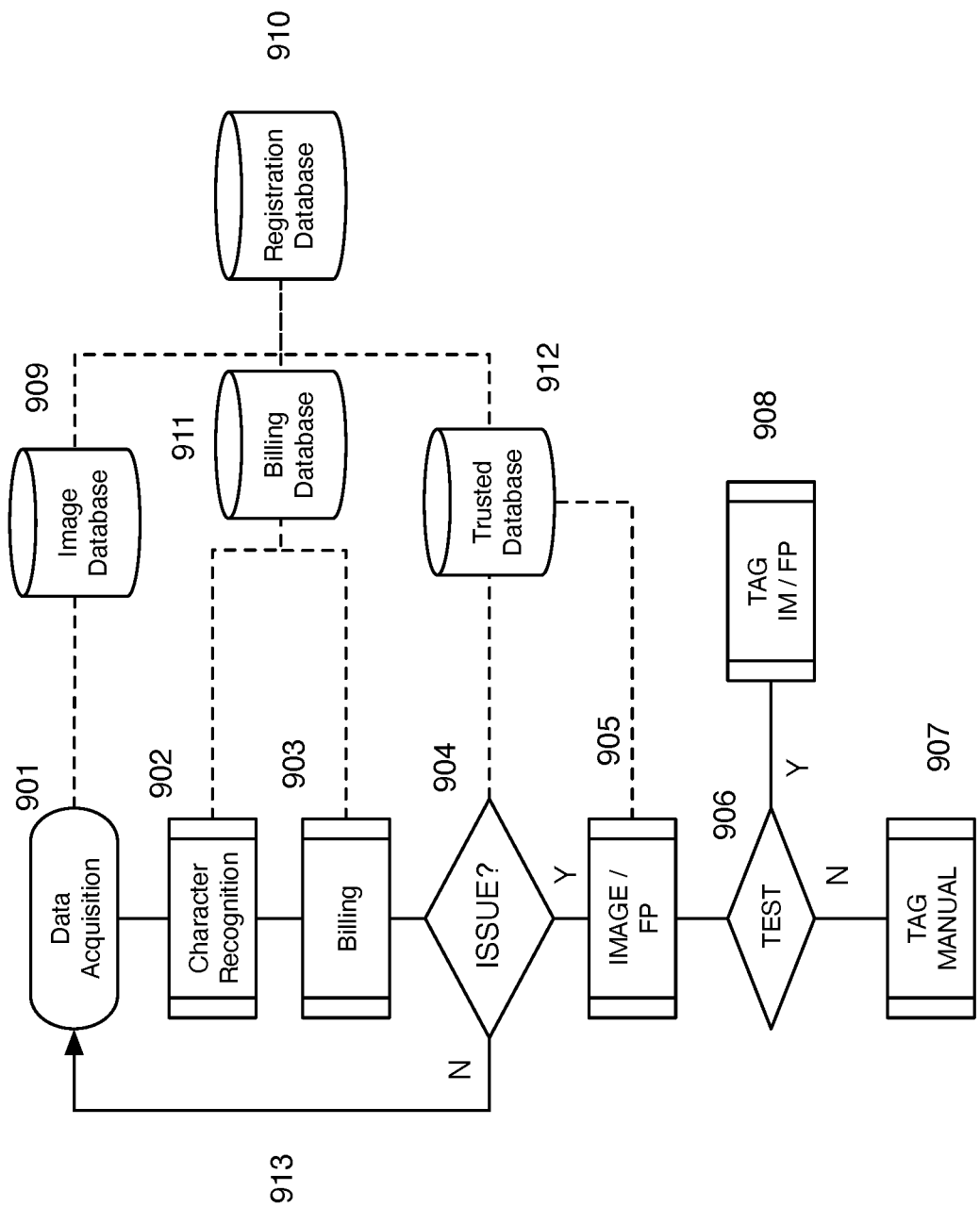
FIG. 9 is a flow chart for a learning process of the invention.

FIG. 9 shows the learning process for determining if an OCR identification would benefit, i.e. reduce or eliminate manual reviews and maintain acceptable accuracy, from the described secondary image analysis. License plate image data is acquired 901 from a population of vehicles on a roadway the data is at least temporarily stored in an image database 909. The dashed lines in the flow chart show connection for dataflow. The images undergo character recognition 902 to identify the characters on the license plate and therefore identify the vehicle. In the preferred embodiment a plurality of images is acquired overtime and subsequently identified through OCR 902 and so on through other steps in the process. The character recognition leads to a billing 903 of the owner of the vehicle. The billing is tied to a billing database 911 that tracks invoices and receipts and a registration database 910 that includes identification of a vehicle owner based upon the license plate characters. In one embodiment, the test for an issue step 904 includes determining if the character recognition of the license plate accurately identified the vehicle and the owner on the basis of the bill being paid. If OCR works accurately there is no need to introduce an additional identification step. In another embodiment the Issue step 904 further includes manual review of the license plate identification through OCR. If verified accurate, (the N branch) an entry is made into a trusted database 912. The entry may include the image from the image database 909 and information regarding potentially conflicting, or lack thereof of, other license plates. Verification may also update the billing database to indicate history of payments made against invoices. If the OCR identification proceeds with no issues the particular plate identification is not tagged and the process continues 913 to data acquisition with only OCR used to identify the vehicle. If an issue with identification arises (the Y branch from 904) the process is tested 905, 906 to determine whether comparison of the image or a fingerprint derived from the image will distinguish the confused plates. In one embodiment verification 904 requires that at least a minimum number of instances of identifying the particular license plate and vehicle have been made over a minimum time period. If the minimum number of data points has yet to be acquired the process loops back 913 to the data acquisition step. If sufficient data has been acquired and there is at least a suspicion of potential misidentification based upon OCR, the stored image and identification data is reviewed 905 per the process described in FIGS. 6-8 above. The data is tested 906 against the rules of equations 1-7. If the rules are all satisfied the identified license plate is tagged 908 such that future OCR identification of the plate will be automatically reviewed through the secondary image review process described above and also as described further in subsequent Figures. In another embodiment only a subset of the rules 1-7 are required to tag the OCR identification for secondary image review. If the data indicates that the rules, or a selected subset of the rules, 1-7 cannot be satisfied (and that verification 904 failed), the image is tagged 907 for manual review. That is subsequent OCR identification of the particular plate will be forwarded for a manual review process. Subsequent to the learning test as described here, data is further acquired and the verification step 904 leads to a second or continuous analysis of the data to determine if the secondary image review initiated through the process and tagging 908 maintains acceptable identification of the population identified as a particular vehicle through OCR and continues to satisfy the rules 1-7. In another embodiment the license plate images to be subjected to subsequent image comparisons are selected a priori. In one embodiment the license plates are selected on the basis of easily confused characters. In another embodiment the image analyses is applied to all newly observed plates. In another embodiment all OCR identifications are subjected to a subsequent image comparison with a verified database of images.

Figure 10:
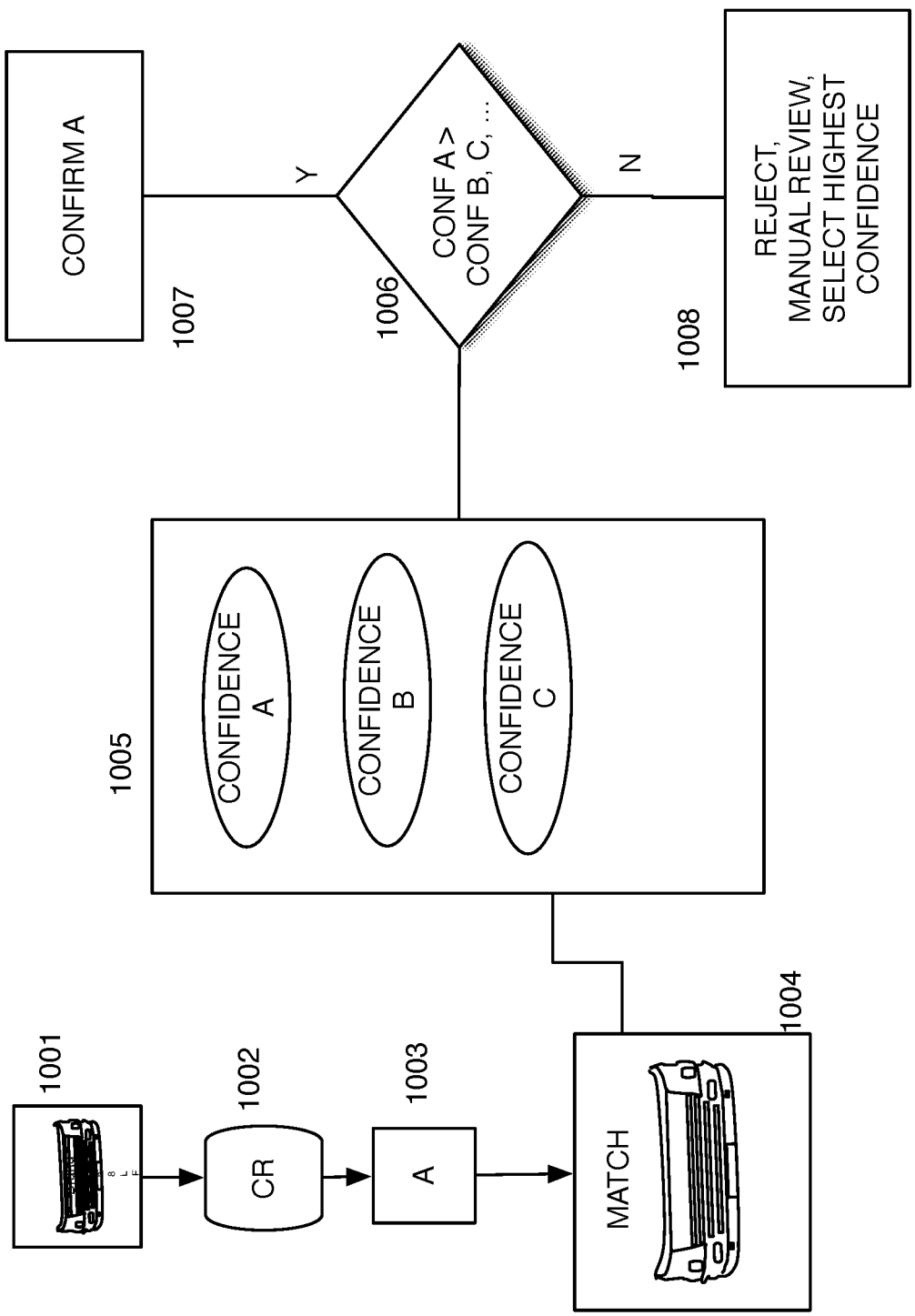
FIG. 10 is a flow chart for practicing the secondary image matching invention subsequent to the learning process.

FIG. 10 summarizes the automated license plate identification process that includes OCR followed by a secondary image review. An image of a vehicle is acquired 1001 and subjected to OCR 1002. The OCR process identifies the vehicle as vehicle A. The identification of vehicle A has been previously tagged as using the secondary image review process. The image of the vehicle acquired in the first step 1001 is then matched 1004 against a subset of images in a trusted database. The subset of images is selected from past history as being members of a population of previously acquired images identified by OCR as vehicle A but including confirmed images of vehicles that are not A. The acquired image 1001 is compared pairwise with each image in the subset and a Confidence estimate is calculated 1005 for each of the subset of images. The confidence estimates are ranked and compared and if the confidence estimate for the comparison with image A in the trusted database is the largest, the identification of the vehicle is confirmed 1007 as vehicle A. If the confidence estimate for the comparison with image A is not the largest then the identification of plate A is not confirmed 1008 and either rejected or subjected to further manual review. Note in all of the discussion the comparison of images includes comparison of fingerprint data extracted from images. In another embodiment the "correct" answer is selected 1006 as the image comparison that has the highest confidence level. In one embodiment the selected identification is selected from any of the members of the subset of images.

Figure 11:
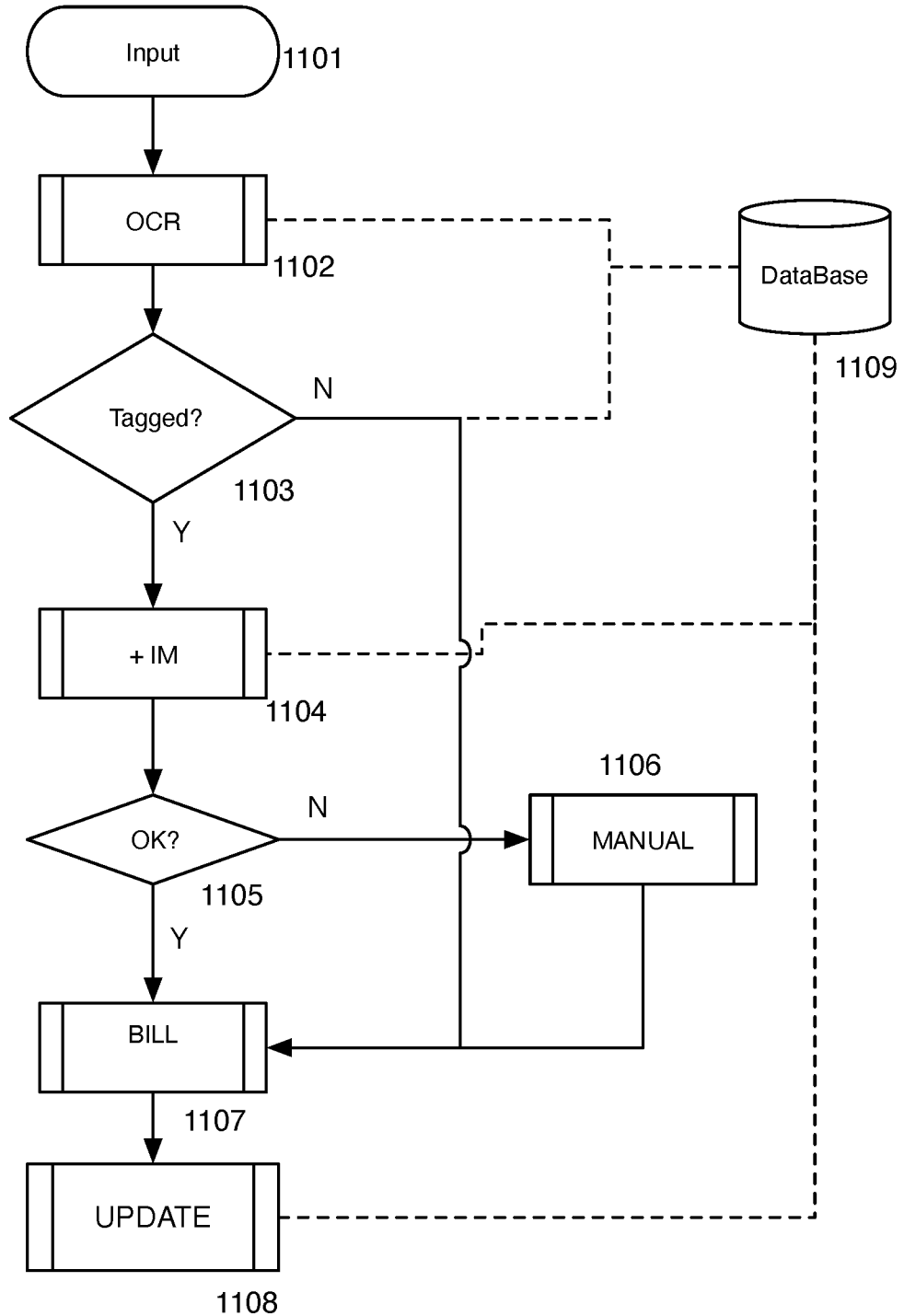
FIG. 11 is a second flow chart for practicing the invention subsequent to the learning process.

FIG. 11 shows a summarize of the entire license plate recognition process. Data is acquired 1101 in the form of an image of a license plate. The image is subjected to optical character recognition 1102 to identify the characters on the vehicle's license plate and therefore identify the vehicle and its owner. If the particular identification from OCR is tagged 1103 in a database 1109 that includes historic data for the license plate identification, then it is subject to a secondary image review process 1104 as that described in FIG. 10 and elsewhere in this document. If the secondary review process 1104 confirms the identification of the vehicle the owner is billed 1107 and if the bill is paid, the database is updated 1108 to reflect a confirmed identification. IF the bill is not paid the database may also be updated to reflect this fact and a manual review of the data is initiated (not shown). If the OCR identification was not previously tagged for secondary image review, such as for a plate that has been previously successfully identified by OCR, the secondary image review process is skipped and the process proceeds directly to billing 1107. The database 1109 is consulted each time a license plate is identified and is used to flag a repeat or an update of the learning process as described in FIGS. 6-8, to resort back to manual review or to drop the need for secondary image review and delete the tag for secondary image review if appropriate.

One embodiment includes a method for identifying characters on license plates said method comprising a learning process as described in FIG. 9 that is comprised of acquiring a plurality of images of vehicles on a roadway, said images including the license plates, identifying, solely by optical character recognition, the characters on the license plates in the plurality of images, and grouping the images identified as the same license plate, thereby providing a plurality of first identification groups, determining if all of the images in each of the plurality of first identification groups are the same license plate, and, an identification process, as described in FIGS. 10 and 11, and used subsequent to the learning process, the identification process comprising acquiring a plurality of images of vehicles on a roadway, said images including the license plates, identifying, solely by optical character recognition, the characters on the license plates in the plurality of images, and grouping the images identified as the same license plate, thereby providing a plurality of second identification groups, matching the identified characters of the second identification groups with the identified characters of the first identification groups, and, if the matched first identification groups included only one license plate confirm the optical character recognition of the second identification group, and, if the first identification groups included more than one license plate comparing pairwise each image in the second identification group with a confirmed image of each image in the first identification group, the comparison providing a confidence estimate for the match of each pairwise compared images, and, the confirmed image including an associated license plate characters, and, assigning the characters of the license plate in the second identification group as the associated licenses plate characters that are associated with the confirmed image that had the highest confidence estimate.

SUMMARY

A license plate recognition and secondary image review system and processes are described. The system supplements optical character recognition with a secondary image review process that matches an acquired image with either images in a trusted database of historic confirmed identification or with fingerprint data derived from the images compared with confirmed fingerprint data from prior identifications contained in a trusted data base. The system provides an alternative to manual reviews in a selected subset of OCR identifications, while maintaining a preselected accuracy and risk of misidentification.

Those skilled in the art will appreciate that various adaptations and modifications of the preferred embodiments can be configured without departing from the scope and spirit of the invention. Therefore, it is to be understood that the invention may be practiced other than as specifically described herein, within the scope of the appended claims.

What is claimed is:

1. A computer-implemented method for identifying character strings on a target license plate said method comprising:
   a) a learning process comprising:
      i) acquiring a plurality of images of a plurality of vehicles on a roadway, said plurality of images each including a license plate, the license plates including the target license plate and non-target license plates,
      ii) identifying, solely by optical character recognition, a character string on the license plates in each of the plurality of images, and, grouping the images identified as having a same character string solely by optical character recognition, thereby sorting the images into a plurality of first identification groups each having an associated character string and a plurality of images,
      iii) comparing the plurality of images in each of the plurality of first identification groups and thereby counting a number of different license plates in each of the plurality of first identification groups,
   b) an identification process, used subsequent to the learning process, the identification process comprising:
      i) acquiring a second image of the target license plate, and,
      ii) identifying, solely by optical character recognition, a character string on the target license plate in the second image of the target license plate, and comparing the character string on the second image of the target license plate with the character strings associated with each of the plurality of first identification groups, and,
      iii) selecting the first identification group whose associated character string is the same as the character string of the second image of the target license plate, producing a selected first identification group, and,
      iv) if the number of different license plates in the selected first identification group is one, identify the characters on the target license plate as the character string associated with the selected first identification group, and,
         if the number of different license plates in the selected first identification group is greater than one, comparing pairwise each of the plurality of images in the selected first identification group with the second image of the target licensed plate, the comparison providing a confidence estimate for a match of each pairwise compared images, and, v) identify the characters on the target license plate as the character string associated with the image in the selected first identification group that has the highest confidence estimate.

2. The computer-implemented method of claim 1 wherein the comparing pairwise each image in the selected first identification group with the second image of the target license plate, compares fingerprint data extracted from the images in the selected first identification group with fingerprint data extracted from the second image of the target license plate.

3. The computer-implemented method of claim 1 wherein the first identification group is comprised solely of confirmed images, and where a confirmed image is one where an owner of a license plate is associated with the characters on the license plate and the owner of the license plate is billed on a basis of identified characters on the license plate and the owner paid the bill.

4. The computer-implemented method of claim 1 wherein the first identification group is comprised solely of confirmed images, and wherein the confirmed image is one that has been manually reviewed.

\* \* \* \* \*